United States Patent
Spears

(10) Patent No.: US 6,765,699 B1
(45) Date of Patent: Jul. 20, 2004

(54) PHOTOSENSOR ARRAY WITH DECREASED SCAN TIME FOR DECREASED OPTICAL SAMPLING RATES

(75) Inventor: Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 610 days.

(21) Appl. No.: 09/704,173

(22) Filed: Oct. 31, 2000

(51) Int. Cl.$^7$ ................................................. H04N 7/04
(52) U.S. Cl. ........................ 358/482; 358/475; 358/513; 358/474
(58) Field of Search ................................ 358/482, 475, 358/509, 513, 483, 474

(56) References Cited

U.S. PATENT DOCUMENTS

| | | | |
|---|---|---|---|
| 4,679,090 A | 7/1987 | Erhardt | 358/213.26 |
| 4,709,259 A | 11/1987 | Suzuki | |
| 4,758,895 A | 7/1988 | Elabd | 358/213.26 |
| 4,803,710 A | 2/1989 | Elabd | 377/60 |
| 5,117,292 A * | 5/1992 | Matsungaga | 358/213 |
| 5,280,186 A | 1/1994 | Lee | 257/232 |
| 5,379,064 A | 1/1995 | Kato | 348/248 |
| 5,396,121 A | 3/1995 | Watanabe | 327/515 |
| 5,523,767 A | 6/1996 | McCorkle | 343/810 |
| 5,523,786 A | 6/1996 | Parulski | |
| 5,686,742 A | 11/1997 | Takeuchi | 257/233 |
| 5,880,777 A | 3/1999 | Savoye et al. | |
| 5,898,509 A * | 4/1999 | Bianchi | 358/483 |
| 5,900,769 A | 5/1999 | Tanabe | 327/515 |
| 6,069,658 A | 5/2000 | Watanabe | 348/316 |
| 6,248,133 B1 | 6/2001 | Komobuchi et al. | 3148/315 |
| 6,580,456 B1 * | 6/2003 | Jacobs | 348/312 |

FOREIGN PATENT DOCUMENTS

| | | |
|---|---|---|
| EP | 0746144 A2 | 12/1996 |
| EP | 0896468 A2 | 2/1999 |
| GB | 2332585 A | 10/1998 |
| WO | WO0105139 A1 | 1/2001 |

* cited by examiner

*Primary Examiner*—Kimberly Williams
*Assistant Examiner*—Negussie Worku
(74) *Attorney, Agent, or Firm*—Augustus W. Winfield

(57) ABSTRACT

A photosensor array has transfer gates that are logically divided into sections, with separate control over each section. Sequential control of the transfer gate sections, coupled with shifting the charge shift register, enables each stage of the charge shift register to accumulate charges from multiple sensor elements. Multiple scanlines are then interleaved into the charge shift register. Because charges from multiple sensor elements are accumulated, the exposure time can be reduced. Because multiple scan-lines are interleaved, the amount of subsampling for lower sampling rates can be reduced or even eliminated. As a result, the overall time required to acquire just the data that is needed for lower sampling rates is substantially reduced.

3 Claims, 4 Drawing Sheets

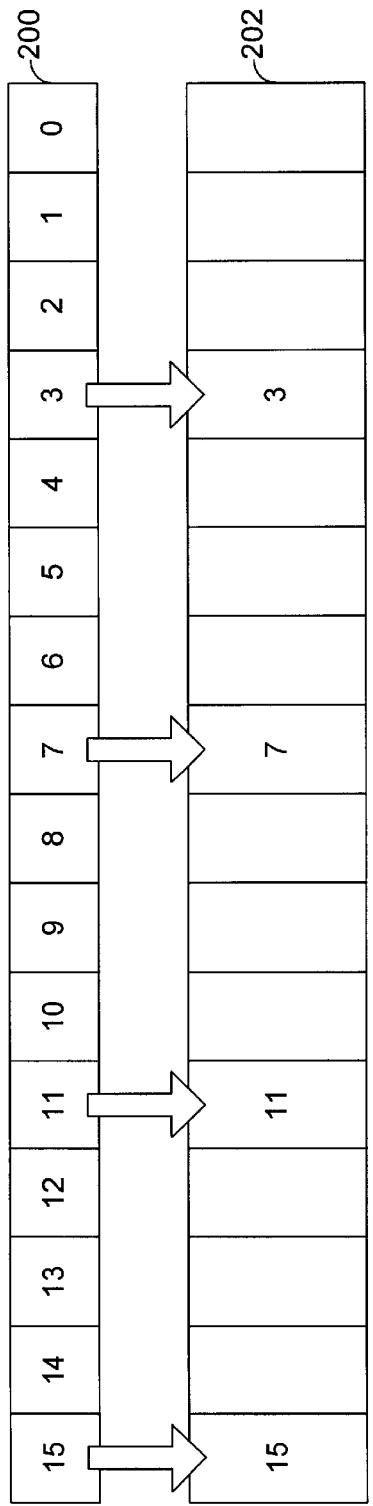
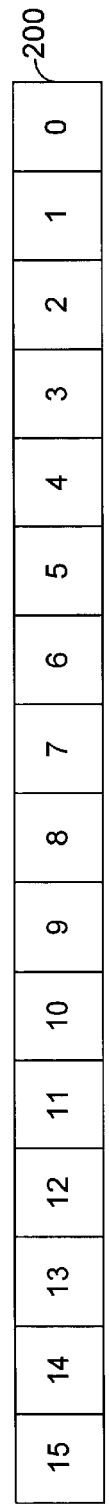
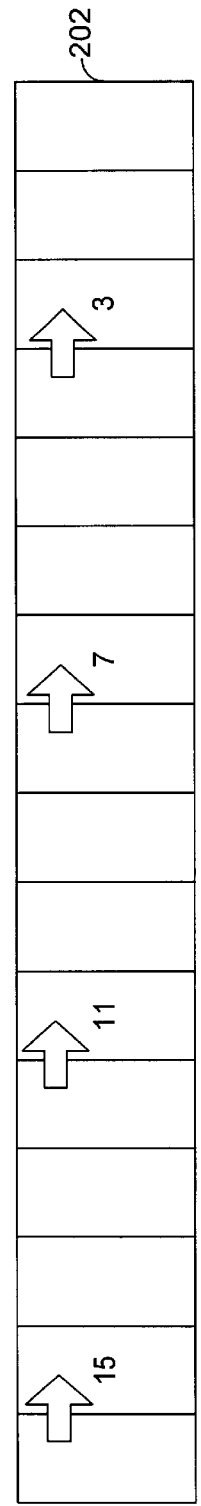
FIG. 2A
FIG. 2B

PHOTOSENSOR ARRAY WITH DECREASED SCAN TIME FOR DECREASED OPTICAL SAMPLING RATES

FIELD OF INVENTION

This invention relates generally to photosensor arrays used for optical image scanners and cameras and more specifically to line arrays commonly used for optical image scanners.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

In general, image scanners use an optical lens system to focus an image onto an array of photosensors. Photosensor arrays typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch (or mm) as measured on the document (or object, or transparency) being scanned. Optical sampling rate as measured on the document being scanned is also called the input sampling rate.

Photosensor arrays for image scanners commonly have three or four rows of sensors, with each row receiving a different band of wavelengths of light, for example, red, green and blue. Each row may be filtered, or white light may be separated into different bands of wavelengths by a beam splitter. Each row of sensors receives light from one line on the document, called a scanline. Typically, the pitch (spacing of individual photosensor elements) is the same for each row, and typically the pitch is set to provide a specified native input sampling rate.

The native input sampling rate is determined by the optics and the pitch of the individual sensors. A scanner operator may select a sampling rate that is less than the native input sampling rate by simply dropping selected pixels, or by using digital resampling techniques. Alternatively, a scanner operator may select a sampling rate that is greater than the native input sampling rate where intermediate values are computed by interpolation. Typically, all the charges or voltages are read from the photosensor array, and are then digitized, and then subsampling or interpolation is performed on the resulting digital pixel data.

Common photosensor technologies include Charge Coupled Devices (CCD), Charge Injection Devices (CID), Complementary-Metal-Oxide (CMOS) devices, and solar cells. Typically, for a CID or a CMOS array, each photosensitive element is addressable. In contrast, CCD arrays commonly serially transfer all the charges, bucket-brigade style, from each line of photosensitive elements to a small number of sense nodes for conversion of charge into a measurable voltage. The present patent document is primarily concerned with photosensor arrays having serial charge shift registers, also called serial readout registers.

For typical CCD line arrays, the sensors are exposed to light for an exposure time; the charges are transferred in parallel, through transfer gates, to charge shift registers; the charges are serially shifted to sense nodes; and the charges are measured (analog-to-digital conversion). Let N=number of sensors per row, $T_s$=shift time to shift a charge from one stage in a charge shift register to the next stage, and $T_c$=analog-to-digital conversion time (including amplifier delay) for one voltage measurement. After exposure, the total time required to process one scanline is then approximately $N*(T_s+T_c)$. If N increases, and all other parameters remain constant, then the time required to process each scanline increases. Typically, one scanline is being exposed while the previous scan line is being converted, and typically exposure time is greater than or equal to processing time for one line.

For the retail image scanner market, native input sampling rates have doubled about every three years. Image scanners are available that have a native input sampling rate that far exceeds what is necessary for many tasks. For example, the optical sampling rate needed for optical character recognition (OCR) is often much less than the native input sampling rates in commonly available image scanners. For a task such as OCR, the data from the scanner is commonly subsampled, so that, for example, three-fourths of the data is simply discarded. However, time is still required to shift and convert all the charges, most of which are not used.

There is need for decreasing the scan time for tasks that require an optical sampling rate that is less than the native input sampling rates.

SUMMARY OF THE INVENTION

A photosensor array has transfer gates that are logically divided into sections, with separate control over each section. Sequential control of the transfer gate sections, coupled with shifting the charge shift register, enables each stage of the charge shift register to accumulate charges from multiple sensor elements. Multiple scanlines are then partially interleaved into the charge shift register.

In an example embodiment, for a first scanline, charges from four adjacent sensor elements are accumulated into one charge shift register stage, so that only one fourth of the charge shift register stages are used. Exposure of a second scanline overlaps processing of the first scanline. Because charges from four sensor elements are accumulated, the exposure time can be reduced by factor of four.

Approximately one-fourth of the first scanline is processed (shifting, amplifying, and analog-to-digital conversion) during exposure of the second scanline. Then, for the second scanline, charges from four adjacent sensor elements are accumulated into one charge shift register stage, resulting in the second scanline interleaved with a portion of the first scanline. The process is repeated, resulting in up to four scanlines partially interleaved in the charge shift register. The portion of the charge shift register closest to the analog-to-converter is essentially fully interleaved. With interleaving and combining of charges, essentially all of the data from the analog-to-digital converter is used. As a result of reduced exposure time, and more efficient use of conversion time, the overall time required to acquire just the data that is needed is substantially reduced. For example, the overall time required to acquire data at one-fourth the native input sampling rate is reduced to almost one-fourth the time required to acquire data at the native input sampling rate.

BRIEF DESCRIPTION OF THE DRAWINGS

FIGS. 2A–2D are block diagrams illustrating a time sequence in which multiple charges are accumulated into register stages.

DETAILED DESCRIPTION OF THE PREFERRED EMBODIMENT OF THE INVENTION

Figure 1:
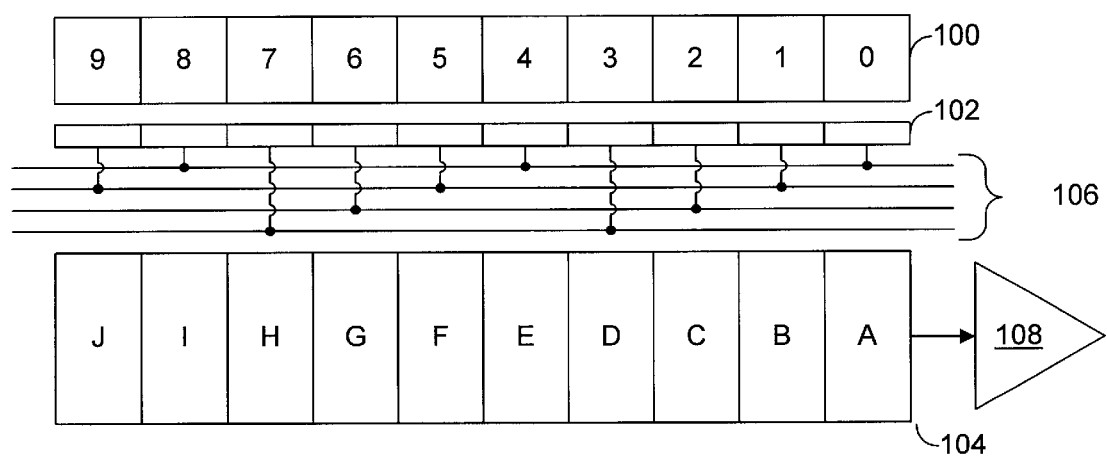
FIG. 1 is a block diagram of an example embodiment of a photosensor array in accordance with the invention.

FIG. 1 illustrates an example embodiment of a photosensor array in accordance with the invention. The array in FIG. 1 has a row of photosensor elements 100, a row of charge transfer gates 102, and a charge shift register 104. In FIG. 1, only ten photosensor elements are shown for illustration, but it is known to have on the order of 10,000 photosensor elements. The photosensor elements 100 are exposed to light; charges are then transferred through the charge transfer gates 102 to the charge shift register 104; and charges are serially shifted in the charge shift register to an amplifier 108, followed by analog-to-digital conversion (not illustrated). It is common in prior art photosensor arrays to simultaneously transfer charges from all photosensor elements to a charge shift register. In contrast, in the photosensor array of FIG. 1, charges transfer from photosensor elements 100 to charge shift register 104 in groups, as controlled by control lines 106 for the charge transfer gates 102. In the example embodiment of FIG. 1, the charge transfer gates are logically divided in groups of four, where one-fourth of the charges, or any integer multiple of one-fourth, can be transferred at one time. The choice of logically dividing the charge transfer gates into groups of four is for illustration only, and the charge transfer gates may be logically divided into groups of any integer.

Figure 2C:
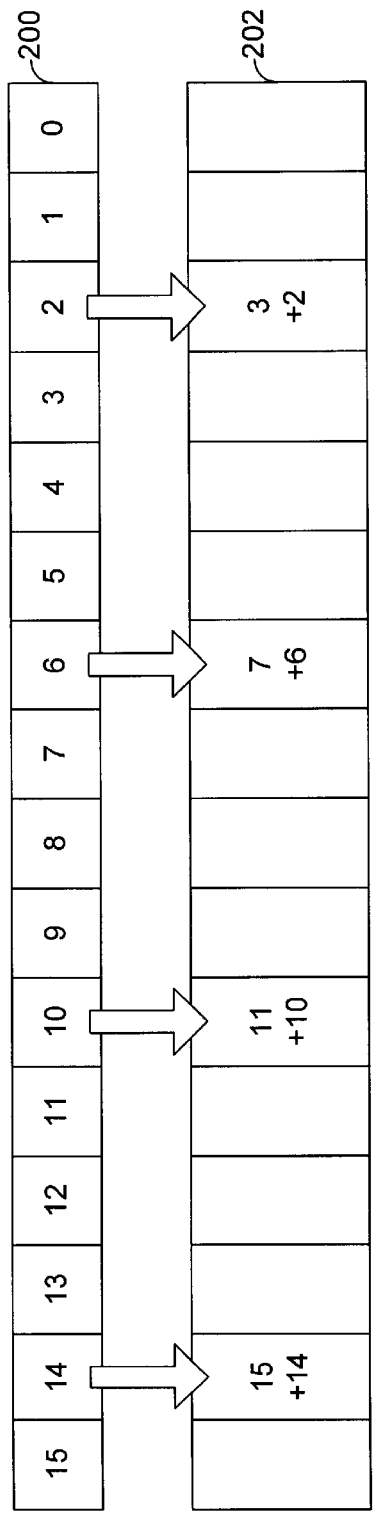
Figure 2D:
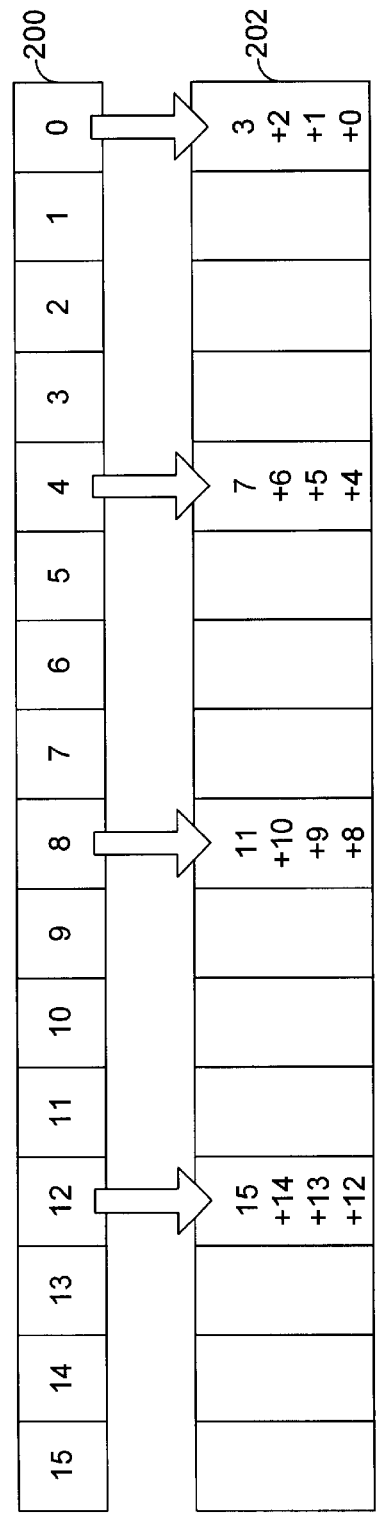

FIGS. 2A–2D illustrate a photosensor array, with the charge transfer gates and control lines removed for clarity. In FIG. 2A, a line array 200 of 16 photosensors transfers charges to a charge shift register 202. After an initial exposure time, charges from photosensor elements 3, 7, 11, and 15 are transferred to the charge shift register. In FIG. 2B, charges in the charge transfer register 202 are shifted one stage to the right. In FIG. 2C, charge from photosensor elements 2, 6, 10 and 14 are added to the charges from photosensor 3, 7, 11 and 15 respectively, which are already present in charge shift register. Shifting and adding is repeated two more times, so that as illustrated in FIG. 2D, charges from blocks of four photosensor elements are accumulated into every fourth stage of the charge shift register 202, and all other charge shift register stages are empty except for noise. Effectively, charges for one scanline, at one-fourth the native sampling rate in the scanline dimension, are present in the charge shift register 202, occupying every fourth stage.

At the state illustrated in FIG. 2D, the photosensor line array 200 is ready to be exposed to a second scanline. Since charges from four photosensors are being added, only one-fourth of the normal exposure time is needed. Assuming that the normal exposure time is about the same as the time required to process 16 charges (amplification and analog-to-digital conversion), then charges from about one-fourth of the stages of the charge shift register 202 can be processed during exposure of the second scanline.

Figure 3A:
FIGS. 3A–3G are block diagrams illustrating a time sequence in which accumulated charges are multiplexed into register stages.
Figure 3B:
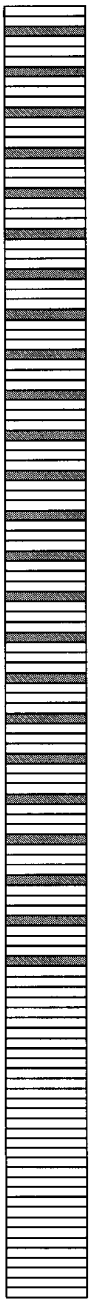
Figure 3C:
Figure 3D:
Figure 3E:
Figure 3F:
Figure 3G:

FIGS. 3A–3G continue the process illustrated in FIGS. 2A–2D, but with more stages in the charge shift register to facilitate illustration of multiplexing. FIG. 3A corresponds to FIG. 2D, with charge accumulated into every fourth stage of the charge shift register. During the second exposure time, about one-fourth of the charges in the charge shift register are processed, so that after the second exposure, the state of the shift register is as illustrated in FIG. 3B. In particular, in FIG. 3B, relative to FIG. 3A, charges have been shifted 30 times to the right. The upper fourth of the shift register is empty, and the lower three-fourths still has charge in every fourth stage. The process illustrated in FIGS. 2A–2D is then repeated, resulting in new charges accumulated in every fourth stage of the shift register. After four charges have been accumulated, the result is as illustrated in FIG. 3C. In FIG. 3C, relative to FIG. 3B, charges have been shifted 3 times to the right. During the third exposure time, about one fourth of the charges in the charge shift register are processed, so that after the third exposure, the state of the shift register is as illustrated in FIG. 3D. In FIG. 3D, the upper fourth of the shift register is empty, followed by a fourth that is one-fourth full, followed by the bottom half which is half full. The process illustrated in FIGS. 2A–2D is then repeated, resulting in new charges accumulated in every fourth stage of the shift register. After four charges have been accumulated, the result is as illustrated in FIG. 3E. During the fourth exposure time, about one fourth of the charges in the charge shift register are processed, so that after the fourth exposure, the state of the shift register is as illustrated in FIG. 3F. In FIG. 3F, the upper fourth of the shift register is empty, followed by a fourth that is one-fourth full, followed by a forth that is half full, followed by a fourth that is three-fourths full. Again, four charges are accumulated, resulting in FIG. 3G, where the fourth of the charge shift register that is closest to the amplifiers is now full. Accordingly, after the fifth exposure, all conversions result in data that is used.

Note in the example of FIGS. 2A–2D, a split transfer gate configuration as in FIG. 1 is used to scan at one-fourth the native sampling rate. However, also note that the configuration illustrated in FIG. 1 can be used to scan at the native input sampling rate by simultaneously transferring charges from all photosensor elements to the charge shift register. Alternatively, the configuration illustrated in FIG. 1 can be used to provide a scan at one-half the native sampling rate in the scanline dimension. Again, dividing the transfer gates into fourths is just an example, and the charge transfer gates may be logically divided into groups of any integer.

It is known to provide two charge shift registers for one photosensor line array. The arrangement is sometimes called bilinear readout. Typically, even numbered photosensors transfer charge to a first charge shift register and odd numbered photosensors transfer charge to a second charge shift register. Then, shifting and analog-to-conversion time is cut in half by shifting and converting in parallel. Split charge transfer gates as illustrated in FIG. 1 are equally applicable to a bilinear readout configuration, with each of the two transfer gates logically divided into sections, with separate control over each section.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of scanning, comprising:

exposing photosensor elements for a first exposure time;

transferring charges from the photosensor elements to a charge shift register, wherein at least some stages in the charge shift register accumulate charges, from the first exposure time, from more than one photosensor element;

exposing the photosensor elements for a second exposure time; and transferring charges from the photosensor elements to the charge shift register, wherein within the charge shift register, charges from the first exposure time and charges from the second exposure time are interleaved.

2. A method of scanning, comprising:

exposing first and second photosensor elements for a first exposure time;

transferring a first charge, from the first photosensor element, to a first stage of a charge shift register;

shifting the charge from the first stage of the charge shift register to a second stage of the charge shift register; and transferring a second charge, from the second photosensor element, from the first exposure time, to the second stage of the charge shift register, thereby accumulating the first and second charges in the second stage of the charge shift register.

3. The method of claim 2, further comprising:

exposing, to light, the first photosensor element, for a second exposure time, resulting in a third charge; and transferring the third charge, from the first photosensor element, to the first stage of the charge shift register, thereby interleaving the third charge with the accumulated first and second charges within the charge shift register.

\* \* \* \* \*